(12) United States Patent
Omura et al.

(10) Patent No.: US 11,462,790 B2
(45) Date of Patent: Oct. 4, 2022

(54) POWER SUPPLY DEVICE

(71) Applicant: SANYO Electric Co., Ltd., Daito (JP)

(72) Inventors: Tetsuji Omura, Osaka (JP); Mitsutoshi Tajima, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 545 days.

(21) Appl. No.: 16/086,214

(22) PCT Filed: Feb. 20, 2017

(86) PCT No.: PCT/JP2017/006108
§ 371 (c)(1),
(2) Date: Sep. 18, 2018

(87) PCT Pub. No.: WO2017/163696
PCT Pub. Date: Sep. 28, 2017

(65) Prior Publication Data
US 2020/0295321 A1    Sep. 17, 2020

(30) Foreign Application Priority Data

Mar. 23, 2016   (JP) ............................. JP2016-057944

(51) Int. Cl.
*H01M 50/20* (2021.01)
*H01M 50/502* (2021.01)

(52) U.S. Cl.
CPC ......... *H01M 50/20* (2021.01); *H01M 50/502* (2021.01); *H01M 2220/20* (2013.01)

(58) Field of Classification Search
CPC ............. H01M 50/204; H01M 50/209; H01M 2220/20; B60L 50/64; B60L 50/66
See application file for complete search history.

(56) References Cited

U.S. PATENT DOCUMENTS

| | | | |
|---|---|---|---|
| 8,263,252 B2* | 9/2012 | Yun ................... | H01M 10/6563 |
| | | | 429/158 |
| 2014/0220391 A1* | 8/2014 | Fujii ................. | H01M 10/6554 |
| | | | 429/7 |

(Continued)

FOREIGN PATENT DOCUMENTS

| | | |
|---|---|---|
| JP | 2015-82391 A | 4/2015 |
| JP | 2015-99650 A | 5/2015 |

(Continued)

OTHER PUBLICATIONS

International Search Report dated Apr. 4, 2017, issued in counterpart application No. PCT/JP2017/006108. (1 page).

*Primary Examiner* — Maria Laios
*Assistant Examiner* — Jordan E Berresford
(74) *Attorney, Agent, or Firm* — WHDA, LLP (57) ABSTRACT

A power supply device having a battery block with a terminal surface on which terminals of a plurality of battery cells are arranged side by side, and a side plate with an elastic part, a holding part and a body part that extends along the side surfaces of the battery block. The elastic part faces the terminal surface and the holding part faces the bottom surface of the battery block. An insulation part is disposed between the elastic part and the battery block and has a positioning region and a pressing region that are disposed on one surface of the insulation part so as to face the elastic part. The positioning region is provided at an end of the insulation part located at the body part side, and extends to a position that is separated farther away from the elastic part than the pressing region.

18 Claims, 11 Drawing Sheets

(56) References Cited

U.S. PATENT DOCUMENTS

| | | | |
|---|---|---|---|
| 2015/0064542 A1* | 3/2015 | Noh | H01M 50/209 |
| | | | 429/156 |
| 2015/0140405 A1 | 5/2015 | Sakurai | |
| 2015/0207116 A1 | 7/2015 | Mochizuki et al. | |

FOREIGN PATENT DOCUMENTS

| | | |
|---|---|---|
| JP | 2015-138674 A | 7/2015 |
| JP | 2015-185415 A | 10/2015 |

* cited by examiner

POWER SUPPLY DEVICE

TECHNICAL FIELD

The present invention relates to a power supply device having a plurality of battery cells.

BACKGROUND ART

In recent years, electric vehicles are widely spread which uses a power supply device for driving. In the electric vehicles, many kinds of configurations are known. For example, there are, vehicles (BEV: Battery Electric Vehicle) which incorporates a driving motor, and hybrid vehicles (HEV: Hybrid Electric Vehicle) which incorporates an engine in addition to a motor. In a power supply device which is incorporated in this electric vehicle, a plurality of battery cells are used. Each of the battery cells is a rechargeable secondary battery, such as a lithium ion battery, or a nickel-hydrogen battery.

Generally, the power supply device for the electric vehicle has a battery block which is configured of the plurality of battery cells. The battery block is formed by assembling the plurality of battery cells. Thereby, the assembly workability of the power supply device can be improved. The number of the battery cells in the battery block is appropriately decided, considering the assembly workability or the like.

In a case where the power supply device is incorporated in the vehicle, a comparatively large load (=strength) is applied to the battery block, by the vibration of the vehicle. In view of this circumstance, a power supply device is proposed where each of battery cells is pressed by an elastic body according to below-described Patent Literature 1.

Concretely, the power supply device disclosed in the below-described Patent Literature 1, has a battery block in which battery cells and spaces are alternatively stacked, and a holding frame which holds the battery block. The holding frame has holding parts which extend at both ends of the battery block in an upper-lower direction. Between one of the holding parts and the battery block, the elastic body for pressing each battery cell is interposed.

CITATION LIST

Patent Literature

Patent Literature 1: Unexamined Japanese Patent Publication No. 2015-99650

SUMMARY OF THE INVENTION

In the power supply device of Patent Literature 1, it is necessary to assemble the holding frame in a state where the elastic body is deformed. Concretely, in the power supply device of Patent Literature 1, the holding frame is configured of a pair of end plates which are disposed at both ends of the battery block, side plates which are disposed at side surfaces of the battery block, and a lower plate having the elastic body. Further, in order to sandwich and fix the battery block and the lower plate, the side plates each have the holding parts which extend at both ends of the battery block in an upper-lower direction. In a case of this configuration, while maintaining a state where the battery cells are pressed by the elastic body, it is necessary to fit the battery block and the lower plate between the holding parts of each of the side plates. Therefore, there is a problem that the assembly workability is bad.

The present disclosure is developed in view of such a situation. One of objects of the present invention is to supply a technology which suppresses displacements of a plurality of battery cells constituting a battery block, and improves the assembly workability.

Solution to Problem

To solve the above-mentioned problem, a power supply device of one aspect of the present invention, is provided with a battery block, side plates, and an insulation part. The battery block includes a plurality of battery cells which each have terminals, and has a terminal surface on which the terminals of the plurality of battery cells are arranged. The side plate includes a body part that extends along side surfaces of the battery block adjacent to the terminal surface. Further, the side plate includes an elastic part and a holding part that project from the body part toward the battery block. The elastic part faces the terminal surface of the battery block. The holding part faces a bottom surface of the battery block located at the opposite side to the terminal surface. An insulation part is disposed between the elastic part and the battery block. Further, the insulation part has a positioning region and a pressing region that are disposed on one surface of the insulation part which faces the elastic part. The pressing region is pressed by the elastic part in a direction perpendicular to the terminal surface. The positioning region is provided at an end of the insulation part located at the body part side. The positioning region extends to a position that is separated farther away from the elastic part than the pressing region in the direction perpendicular to the terminal surface.

Advantageous Effects of Invention

According to the above-mentioned configuration, when the side plate is assembled to the battery block, by utilizing the positioning region which extends to a position that is separated farther away from the elastic part than the pressing region in the direction perpendicular to the terminal surface, the side plate and the battery block can be positioned. Therefore, when the side plate and the battery block is positioned, it can be prevented that the battery cells are misaligned due to the urging force by the elastic part. Accordingly, by using the above-mentioned configuration, while suppressing displacements of the plurality of the battery cells caused by vibrations, the assembly workability of the power supply device can be improved.

DESCRIPTION OF EMBODIMENTS

Figure 1:
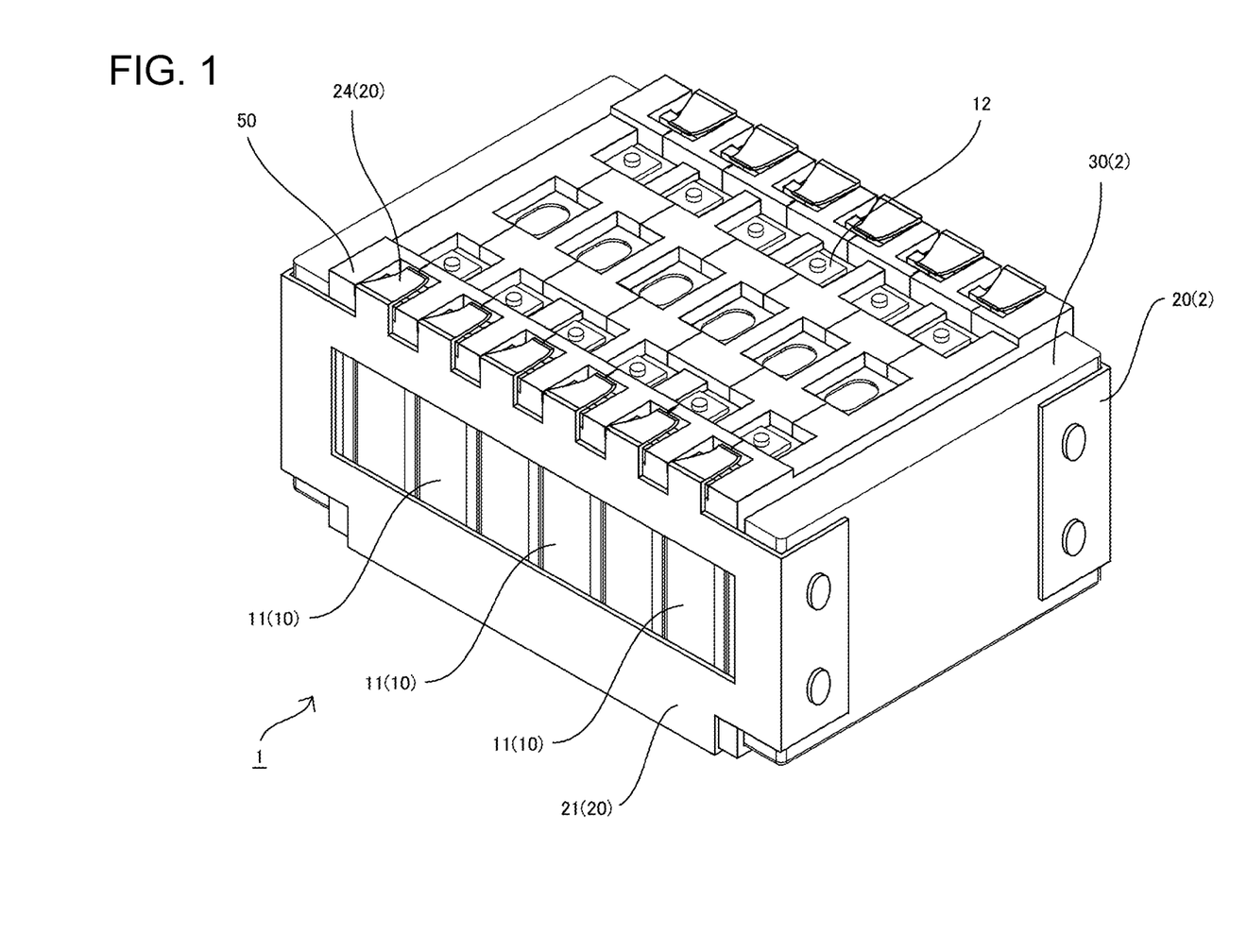
FIG. 1 is a perspective view of a power supply device according to one exemplary embodiment of the present invention.
Figure 6:
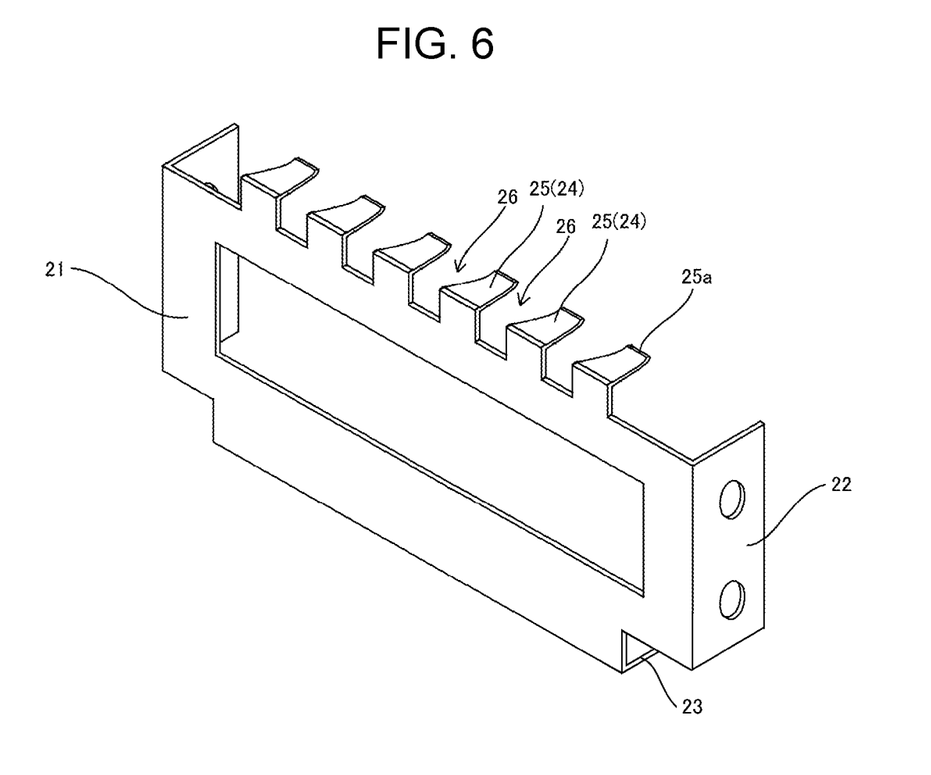
FIG. 6 is a perspective view of a side plate of FIG. 1.

FIG. 1 is a view showing a configuration of a power supply device according to an exemplary embodiment of the present invention. Power supply device 1 has battery block 10 which includes a plurality of battery cells 11, and holding frame 2 which holds the plurality of battery cells 11. Battery block 10 has a terminal surface on which terminals 12 of the plurality of battery cells 11 are arranged side by side. Holding frame 2 is provided with side plates 20 which each include body part 21 that extends along one of the side surfaces of the battery block adjacent to the terminal surface. As shown in FIG. 6, side plate 20 includes elastic parts 24 and holding part 23 that project from body part 21 toward battery block 10. Elastic parts 24 are provided at positions which faces the terminal surface of the battery block 10. Holding part 23 is provided at a position which faces a bottom surface of battery block 10 located at the opposite side to the terminal surface.

Figure 2:
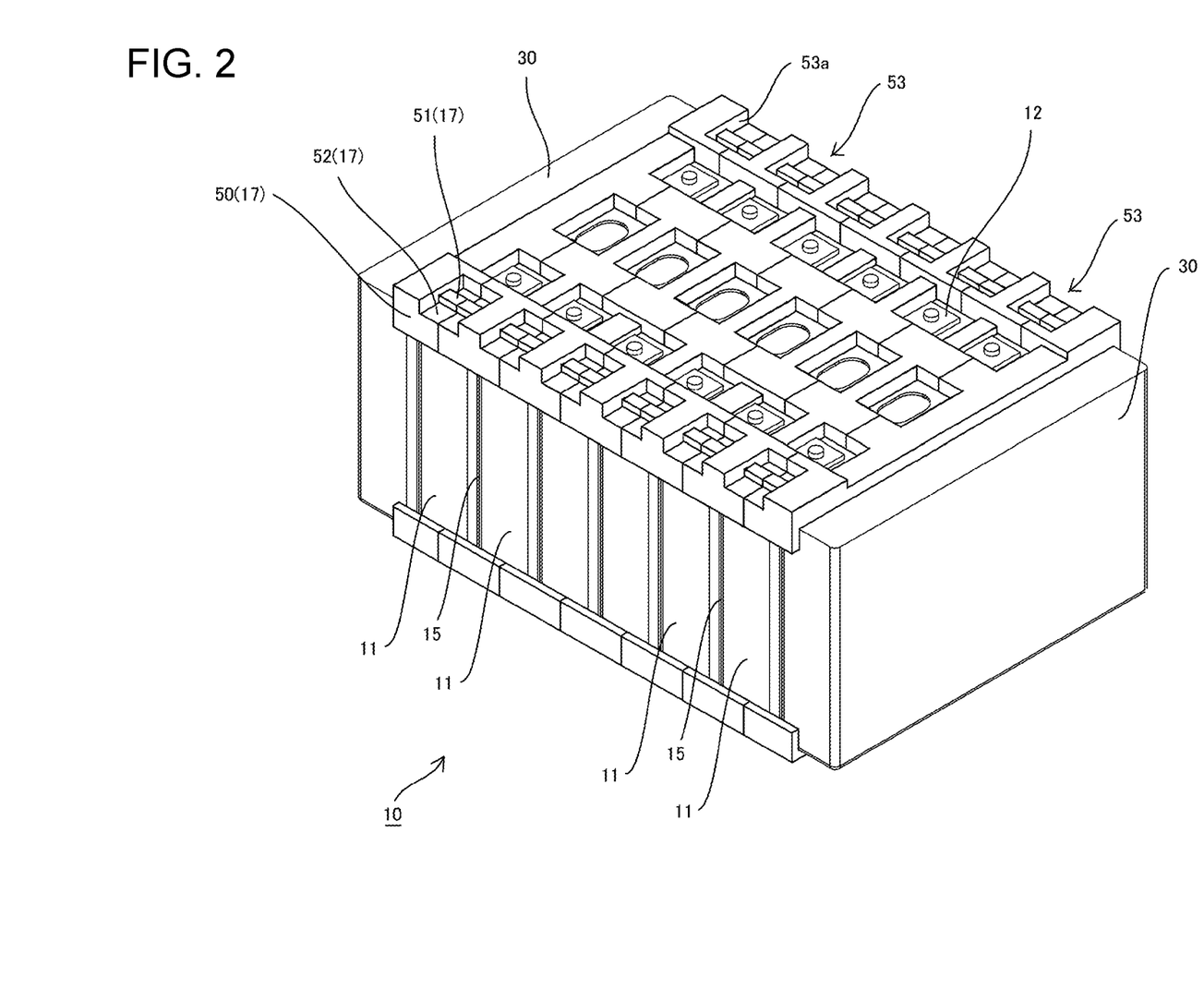
FIG. 2 is a perspective view of a battery block of FIG. 1.
Figure 3:
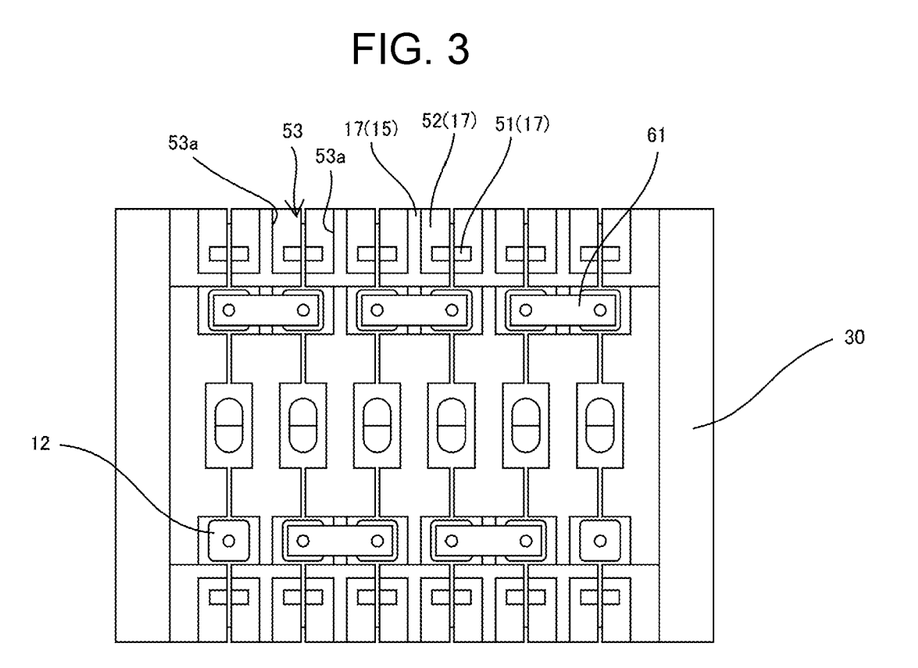
FIG. 3 is an upper surface view of the battery block of FIG. 1.

As shown in FIGS. 1 to 3, power supply device 1 further has elastic parts 24, and insulation part 50 which is disposed between elastic parts 24 and battery block 10. As shown in FIG. 2, insulation part 50 has positioning regions 52 and pressing regions 51 that are disposed on one surface of insulation part 50 which faces elastic parts 24. At least one part of each of pressing regions 51 is pressed by each of elastic parts 24 in a direction perpendicular to the terminal surface. Positioning regions 52 are each provided at an end of insulation part 50 located at body part 21 side of side plate 20. Positioning regions 52 each extend to positions that are separated farther away from elastic parts 24 than pressing regions 51 in the direction perpendicular to the terminal surface.

In power supply device 1 of the above-mentioned configuration, elastic parts 24 press pressing regions 51 of insulation part 50, from the upper surface side of battery block 10 toward holding part 23. Then, elastic parts 24 urge each of battery cells 11 through insulation part 50.

Further, power supply device 1 of the above-mentioned configuration, is assembled by inserting insulation part 50 and battery block 10 between elastic parts 24 and holding part 23. At the time of assembling, in a first posture, tips of elastic parts 24 in each of side plates 20 are respectively located on positioning regions 52. In a second posture after the first posture, the tips of elastic parts 24 are located so as to contact pressing regions 51 of insulation part 50. As mentioned above, since positioning regions 52 extend to a position that is separated farther away from the elastic part than pressing regions in the direction perpendicular to the terminal surface, elastic parts 24 are not deformed, or are hardly deformed, at the second posture. Therefore, in the first posture, each of battery cells 11 is not substantially urged. Accordingly, positioning battery block 10 and insulation part 50, and each of battery cells 11 being urged by elastic parts 24, can be individually carried out. Thereby, the assembly workability of power supply device 1 can be improved.

Preferably, the total value of sizes of battery block 10 inserted between elastic parts 24 of side plate 24 and holding part 23, and the member including insulation part 50 or the like, is smaller than the size between the tips of the tips of elastic parts 24 and the tip of holding part 23. According to this configuration, when side plates 20 are assembled, positioning regions 52 do not contact elastic parts 24. Further, in a case where side plates 30 are at the second posture, it is possible that the urging force by elastic parts 24 against each of battery cells 11 is not applied.

In contrast, the total value of sizes of battery block 10 inserted between elastic parts 24 of side plate 24 and holding part 23, and the member including insulation part 50 or the like, is not necessarily smaller than the size between the tips of the tips of elastic parts 24 and the tip of holding part 23. In the case of this configuration, even at the first posture, each of battery cells are urged against holding part 23, but the urging force is weak, compared with that of the second posture. However, the effect of improving the assembly workability can be expected, while the urging force is weak.

Figure 4:
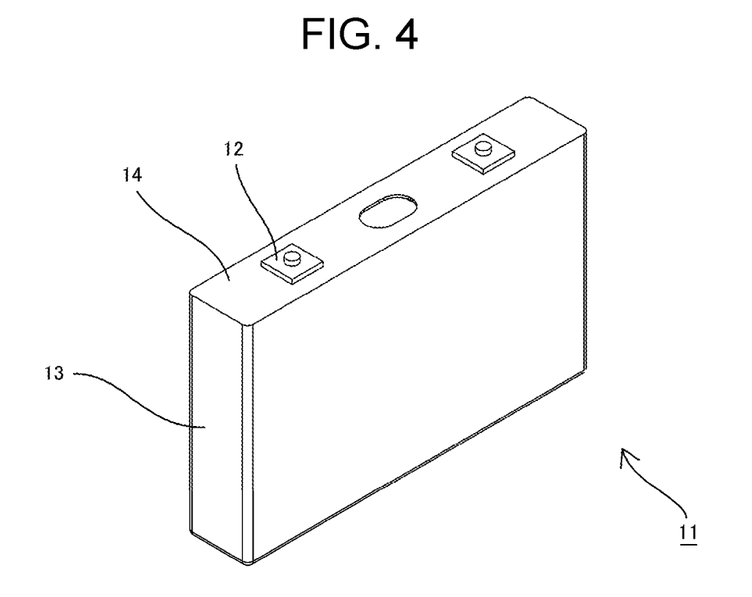
FIG. 4 is a perspective view of a battery cell of FIG. 1.

As shown in FIG. 4, battery cell 11 includes outer can 13 which is made of metal and has an opening, and sealing member 14 which seals the opening of outer can 13. The outer can 13 is formed in a flat rectangular parallelepiped shape having a pair of wide surfaces. Within outer can 13, a generating element including electrolyte and electrode is disposed. Sealing member 14 has positive and negative terminals 12 which are connected to the generating element within outer can 13, to output the power of battery cell 11 through positive and negative terminals 12. Further, in order to enhance the insulation, an insulation layer may be provided so as to surround outer can 13. As the insulation layer of this kind, a shrink tube which made of insulating resin having the heat shrinkage property, or an insulating sheet which is stuck on a surface of outer can 13, can be used. As mentioned above, in battery cell 11, positive and negative terminals 12 are provided at one surface of battery cell 11 where sealing member 14 is located. The above-mentioned battery block 10 is configured by disposing the plurality of battery cells 11 so as to arrange sealing plates 14 in the same plane.

Here, battery block 10 exemplified in FIGS. 1 to 3, is configured of the plurality of battery cells 11 stacked along one direction, but the arrangement is not limited to the one arrangement of the plurality of battery cells 11 shown in the figures.

Figure 5:
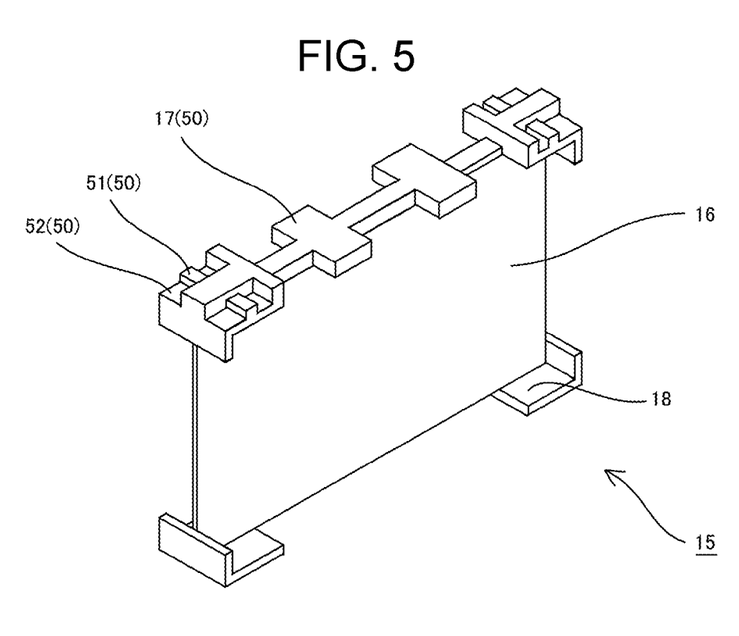
FIG. 5 is a perspective view of an insulation spacer of FIG. 1.

As shown in FIGS. 2 and 3, battery block 10 includes a plurality of insulation spacers 15, in addition to the plurality of battery cells 11. As shown in FIG. 5, insulation spacers 15 are respectively disposed between adjacent battery cells 11, to insulate adjacent battery cells 11 with each other. Insulation spacer 15 includes insulation board 16 which faces the wide surfaces of the outer cans of adjacent battery cells 11. Upper wall part 17 which covers the upper surfaces of adjacent battery cells 11, is provided at the upper end of insulation board 16. Upper wall parts 17 of the plurality of insulation spacers 15 are respectively interposed between battery block 10 and elastic parts 24 of side plate 20. Then, the plurality of upper wall parts 17 constitute insulation part 50. Further, insulation spacer 15 has lower wall part 18 which covers the lower surfaces of adjacent battery cells 11. Lower wall parts 18 of the plurality of insulation spacers 15 are respectively interposed between battery block 10 and holding part 23 of side plate 20.

Insulation spacer 15 is formed in a size which is a little bigger than the size of the wide surface of outer can 13. Thereby, outer can 13 can be inserted in a space which is surrounded by insulation board 16, upper wall parts 17, and lower wall parts 18. In battery cell 11 in a state where battery cell 11 is engaged with insulation spacer 15, at least one part of the surfaces adjacent to the wide surfaces of outer can 13 is covered by upper wall parts 17 and lower wall parts 18. Additionally, by providing upper wall parts 17 and lower wall parts 18, a creepage distance between adjacent battery cells 11 is made longer. When battery cells 11 are cooled, a dew condensation water may be adhered on the surface of outer can 13. Then, by making the creepage distance between adjacent battery cells 11 longer, a short-circuit caused by the dew condensation water can be prevented.

Figure 7:
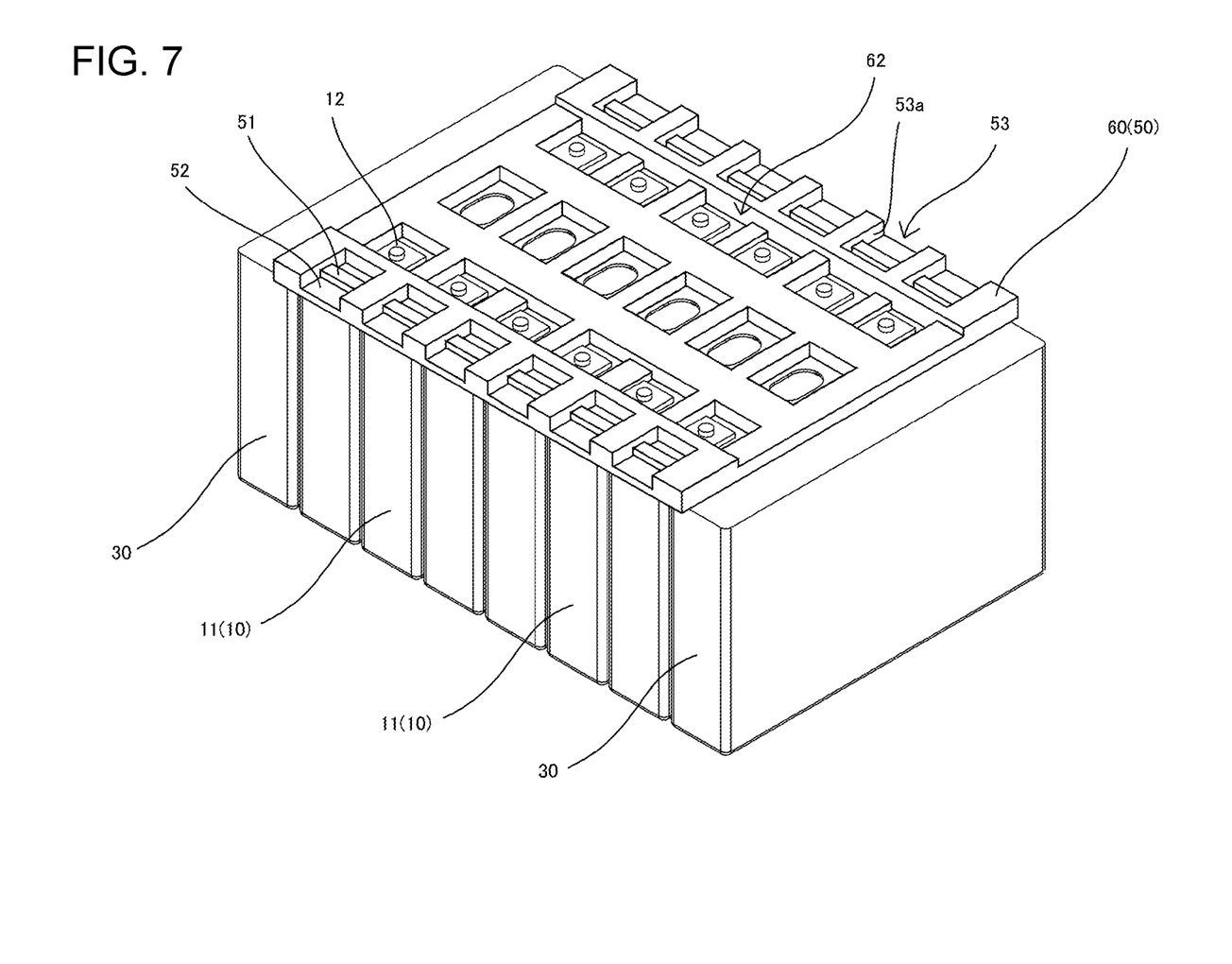
FIG. 7 is a perspective view of a power supply device according to another exemplary embodiment of the present invention.
Figure 8:
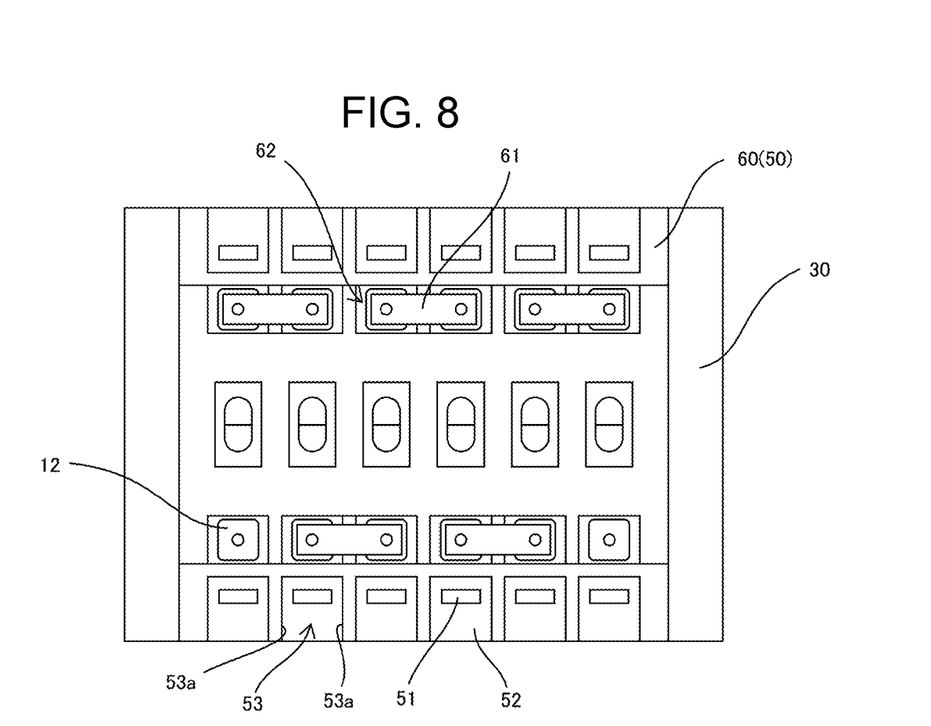
FIG. 8 is an upper surface view of the battery block of FIG. 7.
Figure 9:
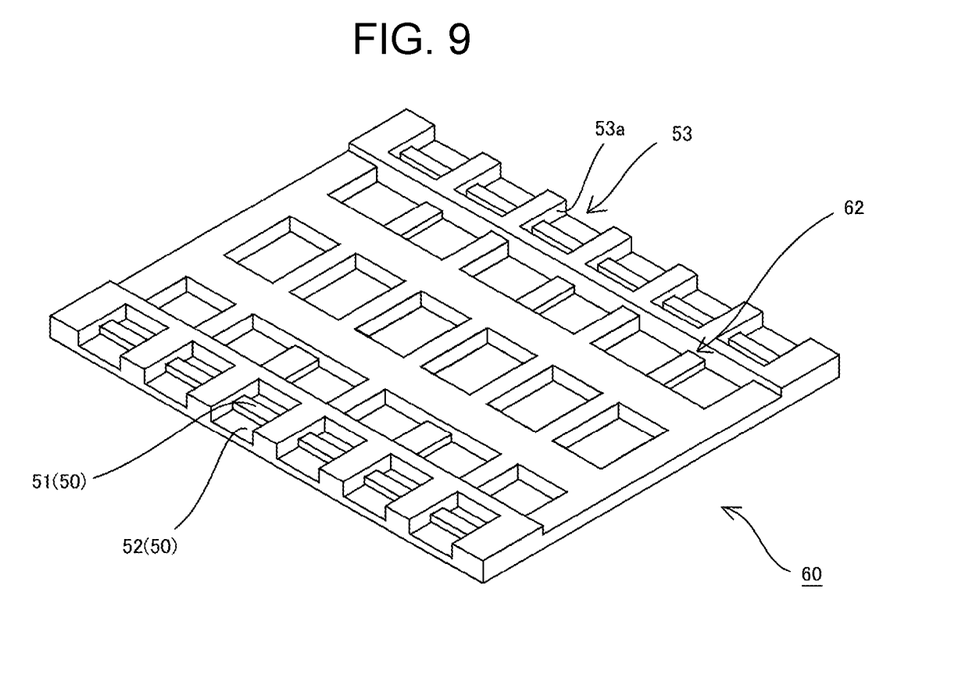
FIG. 9 is a bus bar plate of the battery block of FIG. 7.

Further, as shown in FIGS. 7 to 9, insulation part 50 can be a member other than insulation spacer 15. In battery block 10 shown in FIGS. 7 and 8, bus bar plate 60 is provided which is disposed on the terminal surface where terminals 12 of battery cells 11 are arranged. Bus bar plate 60 made of insulation resin, has a plurality of bus bar storage parts 62. Bus bar 61 for electrically connecting terminals 12 of adjacent battery cells 11, is disposed in each of bus bar storage parts 62. Bus bar plate 60 extends across the periphery of the upper surface of battery block 10, and is interposed between battery block 10 and elastic parts 24 of side plate 20. As mentioned above, bus bar plate 60 can constitute insulation part 50.

As shown in FIG. 1, holding frame 2 includes, concretely, a pair of end plates 30, and a pair of side plates 20. In power supply device 1 exemplified in FIG. 1, the plurality of battery cells 11 are arranged in the one direction, at a posture where the wide surfaces of battery cells 11 faces with each other. The pair of end plates 30 are respectively disposed along end surfaces of battery block 10 in the stacked direction. As shown in FIG. 6, side plate 20 has a pair of connecting parts 22 which are respectively connected to end plates 30. Here, as a connecting means for fixing end plate 30 and side plate 20, bolts or welding can be used as a well-known means. Additionally, as shown exemplified in FIG. 1 or the like, an opening may be formed at body part 21 of side plate 20. Forming the opening can reduce the weight. On the other hand, when an opening is not formed at body part 21, it can enhance the hardness of side plate 20.

In battery cell 11, the outer can could be swollen due to charge and discharge, or a degradation. Especially in battery cell 11 having the outer can of the flat rectangular parallelepiped shape, the outer can tends to be swollen in a direction perpendicular to the wide surface of the outer can. As exemplified in FIG. 1, when holding frame 2 includes the pair of end plates 30, and each of side plates 20 which is provided between the pair of end plates, the dimension between the pair of end plates 30 is regulated by side plate 20, and the swell in the stacked direction of battery block can be suppressed.

As shown in FIG. 6, elastic part 24 of side plate 20 may have a configuration including a plurality of elastic boards 25 which can independently move. in side plate 20 exemplified in FIG. 6, elastic part 24 is formed by pressing a metal board which constitutes side plate 20, and the plurality of elastic boards 25 are formed by providing a plurality of slits 26. According to this configuration, since slits 26 are provided between adjacent elastic boards 25, the plurality of elastic boards 26 can independently move with each other.

In side plate 20 exemplified in FIG. 6, slits 26 for forming elastic boards 25, extends to body part 21. Namely, as shown in FIG. 1, slits 26 for forming elastic boards 25, extends to a location which faces one of the side surfaces of the battery block 10. Each of elastic boards 25 is coupled to body part 21 disposed at the location which faces one of the side surfaces of the battery block 10. Thereby, when each of elastic boards 25 is displaced upward while elastic part 24 contacts pressing region 51, load is applied not only in the upper-lower direction but also in the right and left direction (a direction perpendicular to the side surface of battery block 10), by resilience. Since slits 26 each extend to the location which faces one of the side surfaces of the battery block 10, the load of the right and left direction can be absorbed, by deformation of one end portion of the elastic board which is located at the body part 21 side. Therefore, a concentration of stress can be prevented.

Figure 10:
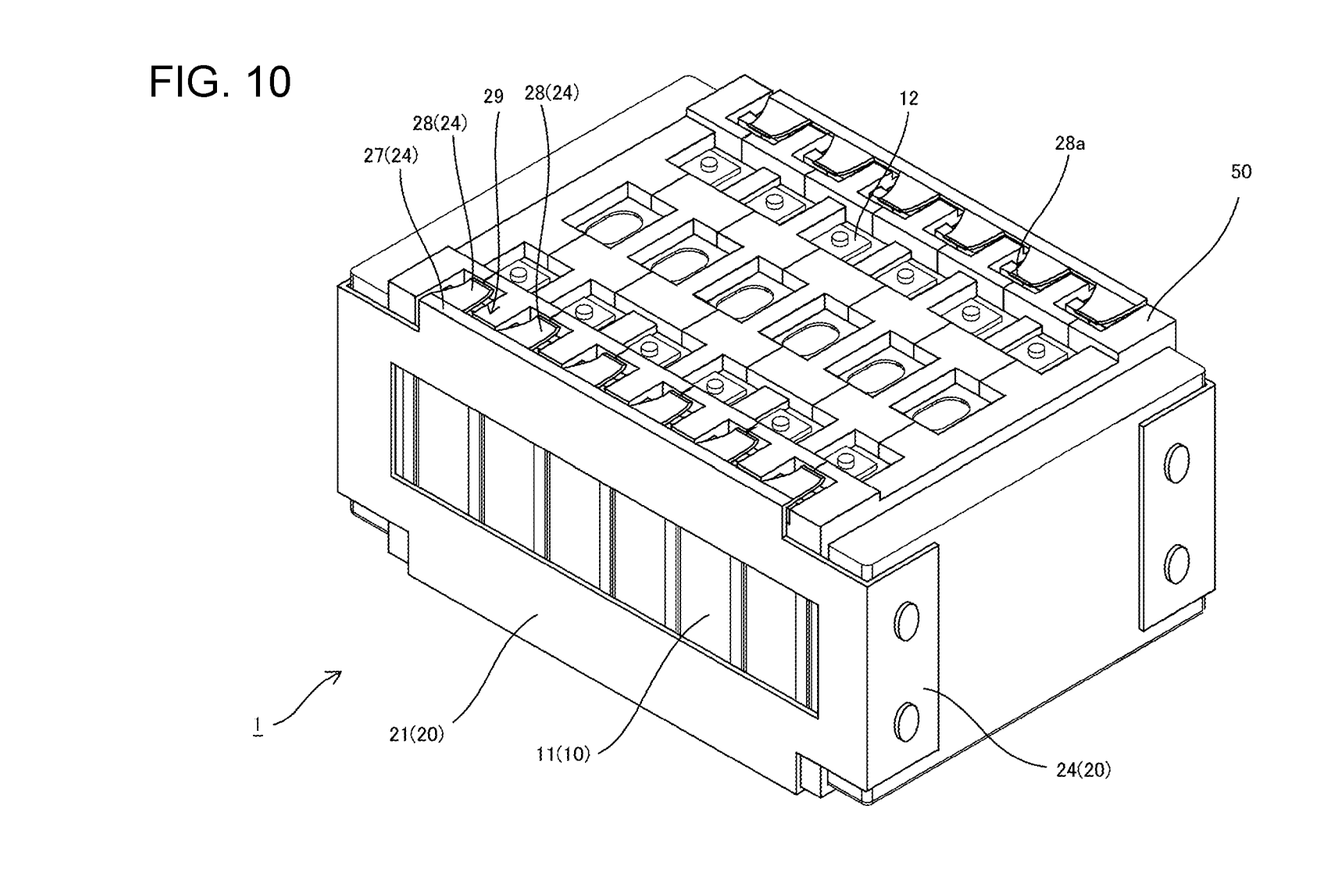
FIG. 10 is a perspective view of a power supply device having side plates of a modified example of the present invention.

Further, as side plate 20 exemplified in FIG. 10, elastic part 24 may include base part 27 which extends to a location which faces the terminal surface of the battery block 10, and a plurality of elastic boards 28 of which one end portions are coupled to base part 27. In this configuration, slits 29 located between adjacent elastic boards 28, do not extend to a location which faces one of the side surfaces of the battery block 10. As mentioned above, when elastic part 24 is displaced upward while elastic part 24 contacts the projection, load is applied not only in the upper-lower direction but also in the right and left direction (a direction perpendicular to the side surface of battery block 10), by resilience. However, as base part 27 is designed so as to withstand the load, the displacement of side plate 20 in the direction perpendicular to the side surface of battery block 10 can be prevented. By preventing the displacement of side plate 20, it is not necessary to consider the change of the dimension of power supply device 1 due to the displacement of side plate 20.

As shown in FIGS. 6 and 10, each of elastic boards 25, 28 which is provided at side plate 20, may have a shape in which its tip gradually becomes narrow toward its end. Further, elastic board 25, 28 has a curve part 25*a*, 28*a* of an arc shape at the tip of elastic board 25, 28. According to these configurations, since elastic part 24 can be easily deformed, the assembly workability of assembling side plate 20 can be improved.

Here, as shown in FIGS. 2 and 7, insulation part 50 may have a plurality of projections which project at locations respectively facing elastic boards 25. In this configuration, the plurality of projections respectively contact elastic boards 25, and are urged toward holding part 23. Namely, above-mentioned pressing region 51 is formed at the tip of the projection, and insulation part 50 which has above-mentioned positioning region 52 and pressing region 51, can be realized with a simple configuration.

Figure 11:
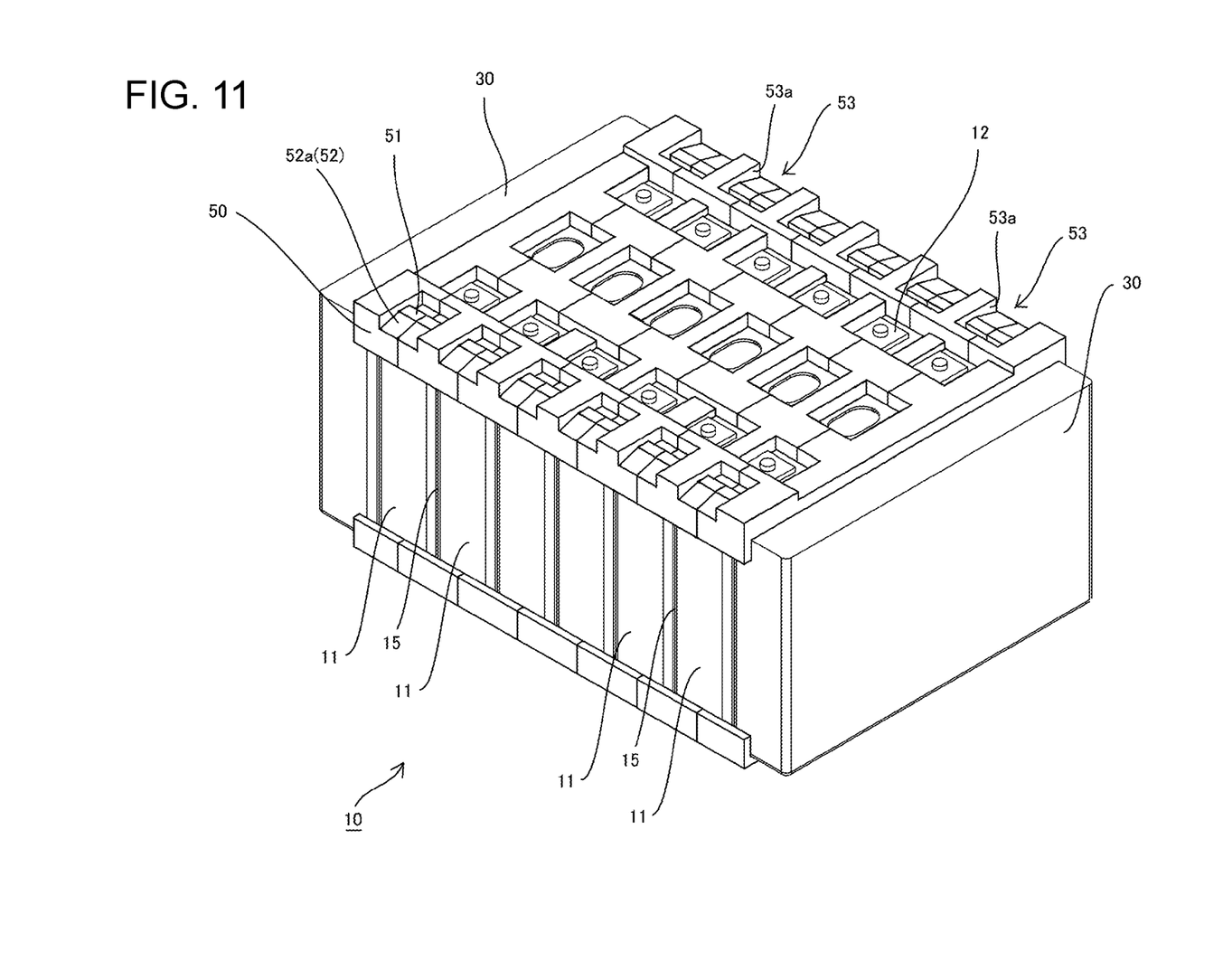
FIG. 11 is a perspective view of a power supply device having an insulation part of a modified example of the present invention.

Further, as shown in FIG. 11, insulation part 50 may has positioning region 52 that includes a taper region 52*a* which has an inclined surface coupled to pressing region 51. Here, there may be no distinct boundary between positioning region 52 and pressing region 51. For example, positioning region 52 is coupled to pressing region 51 through a continuous surface. As an important thing in the present invention, there is the height difference between positioning region 52 and pressing region 51.

As shown in FIGS. 1 to 3, FIGS. 7 to 9, FIG. 11, insulation part 50 may include groove 53 which corresponds to each of elastic boards 25 provided at side plate 20. In each of grooves 53, positioning region 52 and pressing region 51 are formed at the bottom surface of groove 53. Further, each of grooves 53 has a pair of side walls 53*a* which are erected from the bottom surface of the groove. According to the above-mentioned configuration, when side plate 20 is assembled to battery block 10, each of elastic parts 24 can be guided at a predetermined location through the pair of side walls 53*a*.

Next, the assembling process in power supply device 1 of the one exemplary embodiment of the present invention shown in FIG. 1, is explained in the following. First, after preparing the plurality of battery cells 11 and the plurality of insulation spacers 15, battery cells 11 and insulation spacers 15 are alternately stacked, and battery block 10 is formed by arranging the plurality of battery cells 11 and the plurality of insulation spacers 15 along one direction. End plates 30 are respectively disposed at both ends of battery block 10 in the stacked direction. By using a jig not shown in the figures, battery block 10 in a state where the pair of end plates 30 are disposed at both ends, are pressed from both sides in a direction in which the pair of end plates 30 come near. Side plates 30 are attached to battery block 10, in a state where battery block 10 is pressed.

Concretely, battery block 10 is inserted between holding part 23 and the plurality of elastic parts 24 provided at one end edge of side plate 20. Here, as explained above, in the first posture, the tips of elastic parts 24 in each of side plates 20 are respectively located on positioning regions 52. In the second posture after the first posture, the tips of elastic parts 24 are located so as to contact pressing regions 51 of insulation part 50. As mentioned above, in the first posture, the urging force by elastic parts 24 against each of battery cells 11 is not substantially applied. Therefore, in the first posture, battery cells 11 are not misaligned due to the urging force by elastic parts 24. Therefore, side plates 20 and battery block 10 can be easily positioned. After positioning side plates 20, and battery block 20 and insulation part 50, side plates 20 are inserted to the second posture. In the second posture, side plates 20 and end plate 30 are fixed. According to this, each of battery cells 11 is sandwiched and fixed by elastic part 24 of side plate 20 and holding part 23.

As mentioned above, in the assembling process of power supply device 1 of the one exemplary embodiment of the present invention shown in FIG. 1, positioning of battery block 10, and battery block 10 and insulation part 50, and being urged by elastic parts 24, can be individually carried out.

The present invention has been described based on the exemplary embodiment. A person of the ordinary skill in the art can understand that the exemplary embodiment is illustrative only, constitution elements and combined processes can be modified, and such modified examples are covered by the scope of the present invention.

The invention claimed is:

1. A power supply device, comprising:
   a battery block that, includes a plurality of battery cells which each have terminals, and has a terminal surface on which the terminals of the plurality of battery cells are arranged,
   a side plate which includes:
      a body part that extends along at least one of side surfaces of the battery block adjacent to the terminal surface,
      an elastic part that projects from the body part toward the battery block, and faces the terminal surface of the battery block, wherein the elastic part at a point of attachment between the elastic part and the body part is parallel to the terminal surface, and
      a holding part that projects from the body part toward the battery block, and faces a bottom surface of the battery block located at the opposite side to the terminal surface, and
   an insulation part that is disposed between the elastic part and the battery block, and has a positioning region and a pressing region which are disposed on one surface of the insulation part which faces the elastic part,
   wherein the pressing region is pressed by the elastic part in a direction perpendicular to the terminal surface,
   the positioning region is provided at an end of the insulation part located at the body part side,
   the pressing region and the positioning region are partially overlapped by the elastic part when viewed in the direction perpendicular to the terminal surface,
   the pressing region extends parallel to the terminal surface, and
   the positioning region extends to a position that is separated farther away from the elastic part than the pressing region in the direction perpendicular to the terminal surface.

2. The power supply device according to claim 1, wherein,
   the positioning region includes a taper region which has an inclined surface coupled to the pressing region.

3. The power supply device according to claim 1, wherein,
   the elastic part has a plurality of elastic boards which are provided corresponding to the plurality of battery cells, and a plurality of slits which are each provided between adjacent ones of the elastic boards.

4. The power supply device according to claim 3, wherein,
   the plurality of elastic boards each have a curve part of an arc shape at a tip of each of the elastic boards.

5. The power supply device according to claim 3, wherein,
   the plurality of slits each extend to a location which faces one of the side surfaces of the battery block.

6. The power supply device according to claim 3, wherein,
   the elastic part further includes a base part which is coupled to one end of each of the plurality of elastic boards, and
   the base part extends to a location which faces the terminal surface of the battery block.

7. The power supply device according to claim 3, wherein,
   the insulation part has a plurality of projections which project from one surface of the insulation part facing the elastic part toward each of the plurality of elastic boards, and the pressing region is formed at each of the plurality of projections.

8. The power supply device according to claim 1, wherein,
   the battery block further includes a plurality of insulation spacers,
   the plurality of insulation spacers are each disposed between adjacent ones of the battery cells, and each has an upper wall part which partially covers a surface where the terminals are provided in at least one of the adjacent battery cells, and
   the insulation part is formed by the upper wall parts of the plurality of insulation spacers.

9. The power supply device according to claim 1, further comprising:
   a bus bar which electrically connects at least two of the plurality of battery cells, and
   a bus bar plate which is disposed on the terminal surface of the battery block, wherein the bus bar plate includes a bus bar storage part in which the bus bar is disposed, and the insulation part.

10. A power supply device, comprising:
    a battery block that, includes a plurality of battery cells which each have terminals, and has a terminal surface on which the terminals of the plurality of battery cells are arranged, a side plate which includes:
  a body part that extends along at least one of side surfaces of the battery block adjacent to the terminal surface,
  an elastic part that projects from the body part toward the battery block, and faces the terminal surface of the battery block, wherein the elastic part at a point of attachment between the elastic part and the body part is parallel to the terminal surface, and
  a holding part that projects from the body part toward the battery block, and faces a bottom surface of the battery block located at the opposite side to the terminal surface, and
an insulation part that is disposed between the elastic part and the battery block, and has a positioning region and a pressing region which are disposed on one surface of the insulation part which faces the elastic part,
wherein the pressing region is pressed by the elastic part in a direction perpendicular to the terminal surface,
the positioning region is provided at an end of the insulation part located at the body part side,
the pressing region and the positioning region are partially overlapped by the elastic part when viewed in the direction perpendicular to the terminal surface, and
the pressing region contacts the elastic part, wherein the positioning region extends to a position that is separated farther away from the elastic part than the pressing region in the direction perpendicular to the terminal surface.

11. The power supply device according to claim 10, wherein,
  the positioning region includes a taper region which has an inclined surface coupled to the pressing region.

12. The power supply device according to claim 10, wherein,
  the elastic part has a plurality of elastic boards which are provided corresponding to the plurality of battery cells, and a plurality of slits which are each provided between adjacent ones of the elastic boards.

13. The power supply device according to claim 12, wherein,
  the plurality of elastic boards each have a curve part of an arc shape at a tip of each of the elastic boards.

14. The power supply device according to claim 12, wherein,
  the plurality of slits each extend to a location which faces one of the side surfaces of the battery block.

15. The power supply device according to claim 12, wherein,
  the elastic part further includes a base part which is coupled to one end of each of the plurality of elastic boards, and
  the base part extends to a location which faces the terminal surface of the battery block.

16. The power supply device according to claim 12, wherein,
  the insulation part has a plurality of projections which project from one surface of the insulation part facing the elastic part toward each of the plurality of elastic boards, and the pressing region is formed at each of the plurality of projections.

17. The power supply device according to claim 10, wherein,
  the battery block further includes a plurality of insulation spacers,
  the plurality of insulation spacers are each disposed between adjacent ones of the battery cells, and each has an upper wall part which partially covers a surface where the terminals are provided in at least one of the adjacent battery cells, and
  the insulation part is formed by the upper wall parts of the plurality of insulation spacers.

18. The power supply device according to claim 10, further comprising:
  a bus bar which electrically connects at least two of the plurality of battery cells, and
  a bus bar plate which is disposed on the terminal surface of the battery block, wherein the bus bar plate includes a bus bar storage part in which the bus bar is disposed, and the insulation part.

* * * * *